June 11, 1963   D. B. PALL ET AL   3,093,581
HIGH PRESSURE SEALING ELEMENT
Filed Aug. 25, 1959

INVENTORS
DAVID B. PALL &
HARRY CORDES
BY
Eyre, Mann & Lucas
ATTORNEYS

United States Patent Office 3,093,581
Patented June 11, 1963

3,093,581
HIGH PRESSURE SEALING ELEMENT
David B. Pall, Roslyn Heights, and Harry Cordes, Wantagh, N.Y., assignors to Pall Corporation, Glen Cove, N.Y., a corporation of New York
Filed Aug. 25, 1959, Ser. No. 835,910
6 Claims. (Cl. 210—444)

This invention relates to a sealing element for the closure of a vessel or receptacle and more particularly to a sealing element having a pair of flanges in a V configuration adapted for use in a hydraulic system filter capable of operating over a wide range of temperatures and at extremely high pressures without developing leaks.

Certain airplanes have hydraulic systems which must operate at extremely high temperatures and pressures because of their location in the airplane. In one type of system, used within the engine fire wall of the airplane, to meet test specifications the unit must withstand, without developing a leak, a pressure of 3000 p.s.i. for a period of five minutes while exposed to 2000° F. flame temperature. During this exposure, the unit heats up to well above 1000° F.

An elastomeric ring seal even if made of a high temperature resistant rubber cannot withstand this test, but develops leakage within two or three minutes. Only a metal seal has indefinite resistance to such temperatures, but the successful design of such a seal has eluded the art.

O-ring metal seals have been tried. The O-rings commercially available are made by butt welding small-diameter stainless steel tubing, and the weld is thereafter ground flush. Leakage at the time of assembly occurs frequently. It is impossible to establish satisfactory quality control on the weld, so that a proportion of the O-rings fail at the weld after exposure to only a part of the required service cycle.

Bertrand Patent No. 2,641,381 dated June 9, 1953 has suggested a metal V-ring seal. This will sometimes pass this test, but not always, because of difficulty in fitting the seal in precisely the right sealing position in the assembly. A slow seepage usually begins after the unit has been made up for a certain length of time, and this, of course, cannot be permitted. Furthermore, considerable care is required each time the unit is serviced in reassembling the unit, to make certain that a good seal is obtained. Improper assembly of such seals has resulted in very early leakage, sometimes during the first flight of the airplane after servicing.

In accordance with the instant invention, a sealing element is provided whose exterior surface is particularly adapted to establish a leakproof seal with the surfaces meeting to form a closure, and which is of a V configuration, in cross-section, enclosing a core of resilient material, to assure in assembling the initial positive pressure against the surfaces of the closure that is required to establish a leakproof seal. The sealing element of the invention comprises a stainless steel shell surfaced with a metal softer than steel, such as silver, and having a flattened central or base portion from which extend two divergent flanges, the flattened portion and the flanges enclosing at least partially an inner ring of resilient or elastomeric material, such as high temperature-resistant fluorocarbon rubber. The resilient material desirably is bonded to the stainless steel shell, and may extend beyond the end of the steel shell, so that it also directly engages the surfaces of the closure.

Figure 1:
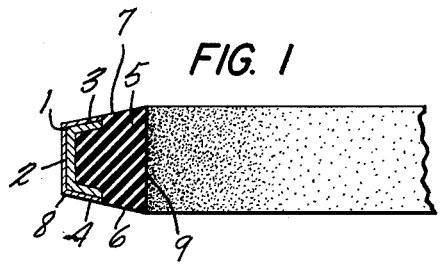
FIGURE 1 is a cross-sectional view of a V-ring sealing element in accordance with the invention.
Figure 2:
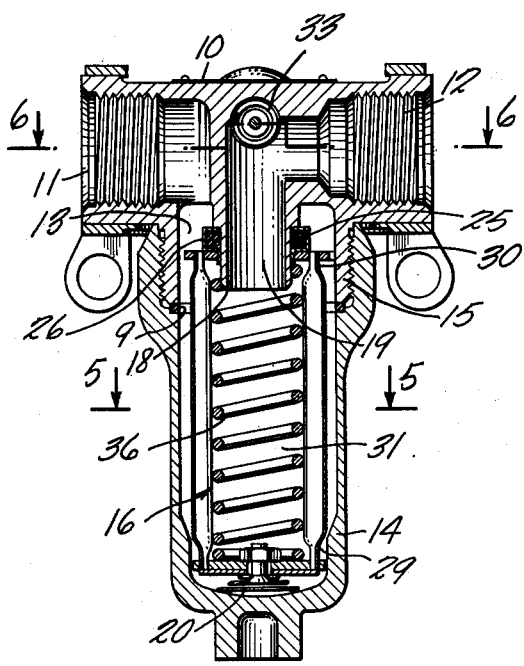
FIGURE 2 is a cross-sectional view of a filter unit incorporating the V-ring sealing element shown in FIGURE 1.
Figure 3:
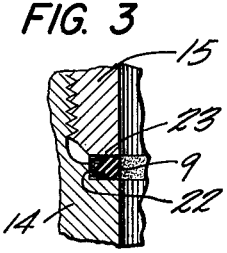
FIGURE 3 is a detailed view of the closure of FIGURE 2, showing the V-ring sealing element in position between the bowl and head portion of the filter unit.
Figure 5:
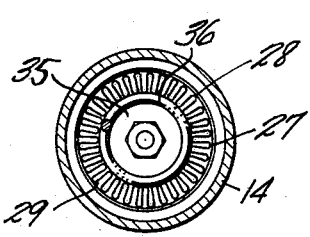
FIGURE 5 is a cross-sectional view of the filter element of FIGURE 2, taken on the line 5—5 of FIGURE 2.

The sealing element of FIGURE 1 comprises a stainless steel shell 1 in the form of a ring having a flattened base portion 2, and two flanges 3 and 4 extending therefrom at any angle to the plane of the element. The flanges enclose a core 5 of resilient material such as high temperature resistant fluorocarbon rubber. The sides 6 and 7 of the core extend beyond and along the line of the flanges 3 and 4, and are flush with the outer surface thereof, thus making possible the continuance of the seal provided thereby.

The outer surface of the flattened portion 2 and the flanges 3 and 4 are covered with a relatively thin layer of silver 8, or other metal softer than steel, of a thickness of the order of 0.010 inch or less, desirably at least 0.003 inch. This coating may be laid down by electroplating or by chemical deposition, as is convenient.

The soft metal coating has three functions. Under high contact pressure between two contacting surfaces, the attractive force of surface atoms therein is quite high when the distance between the surfaces is small, of the order of 1 to 3 A. If the surfaces are made to move relative to each other under such conditions, a tearing action will occur, which may result in "galling." Also, a form of corrosion wear may be caused by internal friction, induced by vibration. This has been called "fretting." The soft metal coating prevents these conditions. It will prevent fusion or welding because of the difference in melting point between silver and steel, and it also will prevent oxidation or corrosion. The soft metal coating also supplies the plastic deformation lacking in stainless steel, and assists in making a tighter seal. A leakproof seal is obtained even if the closure surface is blemished by scratches or uneven portions. This seal is made leakproof in assembly by the elastomeric core, and once made is maintained leakproof until the closure is disassembled, even if the core is destroyed at the temperatures to which the element is subjected.

The flanges 3 and 4 may have any desired angle of from about 5° to about 45° to the plane of the element, but usually this angle will not exceed about 20°. The angle shown is 12°. The angle and length of the base and flanges may be such that the flanges are compressed when the element is put in sealing position, so that in use the element will be in prestressed condition. In such a case, the overall spread across the outside of the flanges is greater than the dimensions of the space allotted for the sealing element. This, however, is not essential when the resilient material extends beyond and is thicker than the shell itself, as shown in FIGURE 1. Resistance to deflection inwardly of the flanges 3 and 4 is provided by the resilient core 5, and the core thus is essential in seating the flanges firmly in sealing relationship against the surfaces of the closure at the time of assembly. Once seated, the soft metal coating maintains the seal leakproof.

While as shown the flanges 3 and 4 are of slightly lesser thickness than the end portion 2, in order to provide greater flexibility, this is not essential, and the flanges 3 and 4 may have a greater or lesser thickness than the end portion, according to the need.

The element shell can be formed of any type of stainless steel, such, for example, as Stainless Steels Nos. 301, 302, 302B, 303, 308, 309, 312, 315, 316, 317, 330, 406, 416, 418, 420F, 440 and 502. The composition of these alloys is given in Chemical Engineer's Handbook, section 18, Table III, pages 2119–2121 (2nd edition 1941.)

The soft metal coating can be of any metal softer than the steel shell. Silver is preferred, but other soft metals that are inert under the operating conditions can be used, such as tin, gold, cadmium, and mixtures of alloys thereof, such as tin-silver and tin-gold.

The core portion is desirably formed of resilient or elastomeric material, resistant to destruction under the operating conditions, such as fluorocarbon rubber (Viton A or Kel–F Elastomer), butyl rubber, fluorinated butyl acrylate (Poly FBA), polyacrylic rubber (Acrylon, Hycar 4021), chlorosulfonated polyethylene (Hypalon S–2), polysulfide rubber (Thiokol), silicone rubber, chloroprene, polychlorotrifluoroethylene (Kel–F) and polytetrafluoroethylene (Teflon). The core will usually withstand temperatures above its rated softening point, if the exposure time is brief, because of the time required for destruction, but even if the core is destroyed, the seal is not broken, and the element can be replaced after disassembling.

The filter unit of FIGURES 2 to 5, inclusive, comprises a head portion 10 provided with inlet 11 and outlet 12 passages for flow of liquid through the unit. The inlet passage 11 opens into the outer of a pair of concentric passages 13 and 19 in the central portion of the head, and the outlet passage extends from the inner 19 of these passages. Both passages communicate directly to the filter bowl 14, which is threaded on a dependent portion 15 of the head, on either side of filter element 16 disposed in the bowl. The filter element is attached by a ring 17 to the wall 18 between the concentric passages 13 and 19. The inner concentric passage 19 opens into the interior of the filter element 16.

The filter element is held in sealing relationship against the dependent portion 18 of the head and the filter bowl, and the closure between the filter element and the head.

The closure requiring a sealing that is leak-proof under high pressures and temperatures is that between the bowl and the head, and here the seal is provided by a sealing element in accordance with the invention, of the type shown in FIGURE 1. The positioning of the seal at this closure is shown in detail in FIGURE 3, wherein it will be seen that the flattened or base portion 2 abuts against an L-shaped indentation 22 in the inner wall of the filter bowl, constituting the sealing surface. This indentation is carefully tooled, and the seal is made between base portion 2 and flange 4 of the V-ring, in conjunction with a wall portion 6 of the core 5. The core end 9 of the V-ring faces the inside of the bowl.

Flange 3 and wall 7 of the core abut against a smooth sealing surface 23 at the lower portion of the head, and provide a true seal against this surface when the filter bowl is fully threaded onto the head.

If desired, the distance between walls 22 and 23 can be slightly smaller than the overall distance between flanges 3 and 4 of the V-ring, so that these flanges are compressed slightly, as also is the core portion 5, to improve the seal.

Figure 4:
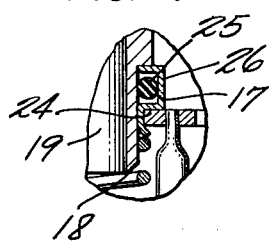
FIGURE 4 is a detailed view of the closure and seal provided between the filter element and head portion of the filter unit of FIGURE 2.

The seal between the filter element 16 and the wall portion 18 of the head is shown in detail in FIGURE 4. The filter element has a flange 24 which fits snugly into position against the ring 17, thus holding the element in position. An O-ring 25 is placed between the upper portion 26 of the ring and the wall, and dimensioned so that it is under slight compression when the filter element is in position, thus completing the seal between the filter element and the head and preventing any escape of filtered fluid into the outer portion of the filter bowl, or vice versa. The O-ring can be made of resilient material or of metal, such as stainless steel, as may be desirable, but when the unit is to be used under high pressures and temperatures it will usually be desirable to employ a metal, for greater temperature resistance.

The filter element 16 can be of any desired type, and forms no part of the invention. The element used in the filter unit shown in the drawing is made of corrugated woven stainless steel wire mesh 27, the wires of which are bonded together, prepared in accordance with Serial No. 562,127, and filed January 30, 1956, now Patent No. 2,925,650, and formed into relatively deep corrugations 28 approximately ½ inch in depth, running coaxially of the unit and taking the general cylindrical or tubular form shown in the drawings. The upper and lower ends 29 and 30 are symmetrically compressed, as by crimping, and each end is fitted between an outer ring and an inner ring, the three being joined by a weld. At the top the outer ring carries the sealing flange 24 at its outer edge. A spring 36 provides internal support for the wire mesh, but other types of internal supports could be used.

Figure 6:
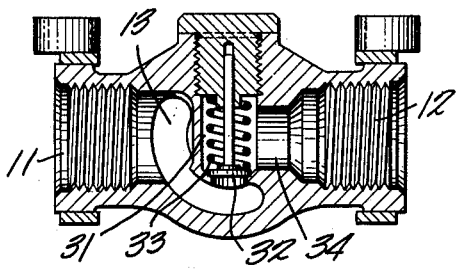
FIGURE 6 is a cross-sectional view of a portion of the head of the filter unit of FIGURE 2, showing the relief valve arrangement.

The relief valve 31, shown in FIGURE 6, comprises a poppet 32 biased by a spring 33 against a seat in the wall of the inlet 11. Clogging of the unit increases pressure against the poppet to beyond the yield point of the spring, opening the valve, and thereby opening a passage 34 between inlet and outlet, bypassing the filter.

In operation, the fluid to be filtered flows in the inlet 11, downwardly through the outer concentric passage 13, filling the filter bowl, and then forces its way radially inwardly through the filter element 16 into the enclosure 35, whence it flows upwardly through the passage 19 and emerges from the unit via the outlet 12. The flow of fluid is easily reversed whereby dirt collects on the inside of the filter instead of the outside.

The sealing element is formed of stainless steel because of its high elastic limit, resistance to corrosion, and resiliency. The filter unit incorporating it is desirably formed entirely of stainless steel, so as to eliminate any differences in the coefficient of expansion between the closure parts, and thus avoid the development of leaks with changes in temperature. When so constructed, it is capable of operation without leakage at temperatures ranging from −65° to 1000° F. at pressures up to 3000 p.s.i., using a filter element capable of removing 10 micron particles. The flow capacity can be 12 g.p.m. at 24 p.s.i. maximum pressure drop.

It will be apparent that the sealing element of the invention is particularly useful at high temperatures and pressures, under which conditions it is difficult to prevent leakage. The element is easily put in position in assembly of devices incorporating it, and need not be precisely positioned but will seat to form a leakproof seal because of the resistance to compression provided by the resilient core portion. The larger dimensions of the core portion relative to the metal portion make the element self-positioning in most instances. The sealing is positive both at high and low pressures, and a good seal is obtained with a minmum of tightening because of the angle of the flanges and core portion of the element. This seal is maintained leakproof even if the core is destroyed under the operating conditions because of the soft metal surface coating. The sealing element can be used for so long as the core retains its resiliency, and the sealing will in each case be positive even after repeated cycles at extraordinary pressures and temperatures. Filter units of the type shown in FIGURES 2 to 6 have withstood 100,000 cycles at up to 4500 p.s.i. internal pressure without leakage.

The sealing element is quite simple to manufacture from strip material. The resilient core portion can be fitted first to the strip, such as by bonding, and the flanges then crimped against the core portion. In such a construction, no bonding between the core and shell portions is necessary. It is also possible to mold the resilient core portion into the exact configuration desired, providing an indented portion at the smaller end conforming to the shell. If the fit is not sufficently tight to hold the core in position, the core can be bonded to the shell using any conventional adhesive for bonding such materials to metal.

It will, of course, be apparent to those skilled in the art that the sealing element need not be in the shape of a ring but can take any shape required by the unit, and that it is useful not only in filter units such as is shown in the drawing but also in any type of pressure vessel requiring a seal which must be maintained over an extraordinary temperature and pressure range.

We claim:

1. A sealing element for insertion between two surfaces to be sealed against fluid leakage at high pressures and temperatures comprising, in combination, a stainless steel sheet surfaced with a coating not exceeding 0.010 inch in thickness of a metal softer than the steel sheet, the coating serving as a sealing surface when the element is seated against the surfaces to be sealed, the element having a flattened base portion constituting a periphery thereof and from which extend two divergent flanges, each flange having a flat surface and extending from the base portion at an enclosed angle greater than 90°, and a core of resilient material enclosed at least partially by the base portion and the flanges, and resisting inward deflection of the flanges from the said enclosed angle to the angle at which the element is seated in sealing relationship against the surfaces to be sealed.

2. A sealing element in accordance with claim 1 in which the core projects beyond the ends of the flanges and along the line thereof.

3. A sealing element in accordance with claim 1 in which the core is bonded to the shell.

4. A sealing element in accordance with claim 1 in which the core is of high temperature-resistant fluorocarbon rubber.

5. A sealing element in accordance with claim 1 in which the metal surface is of silver.

6. A filter unit comprising, in combination, a head having inlet and outlet passages, a filter bowl secured to the head including a filter unit, and, disposed in a fixed gap between the filter bowl and the head, a sealing element comprising, in combination, a stainless steel sheet surfaced with a coating not exceeding 0.010 inch in thickness of a material softer than the steel sheet, the coating serving as a sealing surface for the element in the gap, the element having a flattened base portion constituting a periphery thereof and from which extend two divergent flanges, each flange having a flat surface and extending from the base portion at an enclosed angle greater than 90°, and a core of resilient material enclosed at least partially by the base portion and the flanges.

References Cited in the file of this patent

UNITED STATES PATENTS

| | | |
|---|---|---|
| 813,429 | Hull | Feb. 27, 1906 |
| 1,815,602 | Russell | July 21, 1931 |
| 2,199,647 | Mueller et al. | May 7, 1940 |
| 2,249,127 | Goetze | July 15, 1941 |
| 2,322,131 | Heftler | June 15, 1943 |
| 2,345,515 | Tweedale | Mar. 28, 1944 |
| 2,407,190 | Tait | Sept. 3, 1946 |
| 2,439,936 | Kasten | Apr. 20, 1948 |
| 2,641,381 | Bertrand | June 9, 1953 |
| 2,697,623 | Mosher | Dec. 21, 1954 |
| 2,789,847 | Jackson | Apr. 23, 1957 |
| 2,840,350 | Pierce | June 24, 1958 |
| 2,852,291 | Hults | Sept. 16, 1958 |

FOREIGN PATENTS

| | | |
|---|---|---|
| 506,682 | Germany | Aug. 28, 1930 |